July 31, 1928.

J. BARKER

VEHICLE TIRE

Filed July 15, 1927

1,678,631

Inventor:
John Barker
BY: Runge, Boyer & Bachelor
ATTORNEYS.

Patented July 31, 1928.

1,678,631

UNITED STATES PATENT OFFICE.

JOHN BARKER, OF LONDON, ENGLAND.

VEHICLE TIRE.

Application filed July 15, 1927, Serial No. 205,905, and in Great Britain July 12, 1926.

This invention relates to semi-solid tires for motor road vehicles and like purposes, and more particularly relates to the type of tire employing perforations for the absorption of shock. At present, solid tires of this type usually have transverse circular perforations, and although these perforations serve the purpose of absorbing shock, their disadvantage is a liability for the tire to crack at points connecting the perforations because there is no means of absorbing the lateral pressure through a perforation other than compressing the rubber in the unperforated part. This also interferes with the proper resiliency or shock absorbing function of the tire. The object of my invention is to provide a form of solid tire in which these disadvantages are obviated and in which a better resilient or cushioning effect is obtained, and in accordance therewith the present invention is broadly characterized in that the holes or a fair proportion of them are formed with projections extending inwards relative to the holes, the projections being located on the side walls of the holes which cross the points connecting the holes, or in other words, the selected holes are formed with projections on their walls which lie in substantially radial directions relative to the axes of the holes.

According to the preferred embodiment of the present invention, a tire of the type set forth comprises in combination a solid rubber body having two sets of transverse apertures, the two sets being arranged alternately in succession, and one set consisting of a large hole of polygonal configuration, some or all of the sides of which are formed with inwardly directed projections, the other type of hole being relatively smaller.

It is well known with existing forms of solid tires having transverse circular section perforations that the rubber intervening each pair of perforations absorbs the lateral shock due to radial pressure passing through one of the perforations when the part of the tire having the selected perforation is engaging the road surface, the reason for this being that the ordinary cylindrical or rectangular section perforations at present employed are spaced too wide apart and have not the requisite configuration to flex readily in either lateral direction when radial pressure is applied to the tire. This results in setting up the internal stresses referred to with a consequent risk of the tire cracking concentrically on a line passing through the perforations. This present invention not only employs the ordinary cylindrical or polygonal perforations, but employs in addition to these perforations relatively larger perforations disposed between the smaller perforations, these relatively larger perforations being substantially hexagonal in cross section. Two parallel sides of each hexagonal perforation are disposed concentrically with the tire and the remaining two pairs of sides if continued to complete a proper hexagon would meet upon an imaginary line concentric with the tire and passing through the axes of the smaller perforations. In the present invention, however, these sides do not meet to provide proper hexagonal apertures, but are interrupted by bulging inwards the meeting points of these two pairs of sides, whereby each of the larger apertures has a cross section substantially after the manner of a figure 8 or a dumbbell configuration.

The inwardly bulged portions are in the form of transverse lugs and their opposing surfaces are sufficiently spaced to ensure that they never meet when radial pressure is applied to the tire through the aperture. By this means I have found that when radial pressure is applied through each larger aperture the inwardly bulged or lug-like parts of the aperture move away from each other, but when radial pressure is applied through the smaller aperture, the lug-like or inwardly bulged portions of the part of larger apertures each side of the small aperture move away from the smaller aperture and relieve the material of the tire of strain either side of the smaller aperture.

Instead of making the larger apertures substantially figure 8 in configuration they may each be in the form of three limbs extending radially from a common point. If desired, these two types of larger apertures may be used in combination arranged alternately, the three limbed apertures taking the place of the small apertures, or taking the place of half of the larger apertures in conjunction with the small apertures.

In order that my invention may be clearly understood and readily carried into effect, I have appended hereto a sheet of drawings somewhat diagrammatically illustrating embodiments of same, and wherein—

Figure 1:
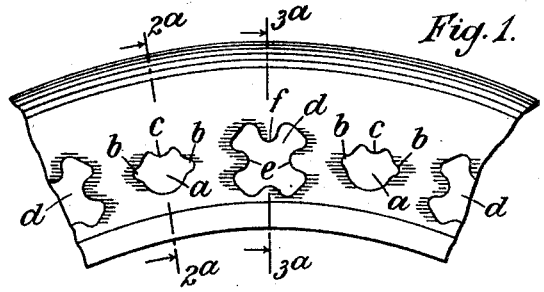
Fig. 1 is a broken side elevation of a solid tire.
Figure 2:
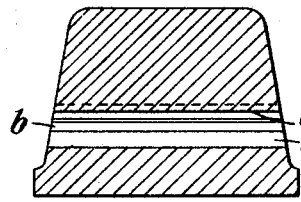
Fig. 2 is a section on the line 2ᵃ—2ᵃ of Fig. 1.
Figure 3:
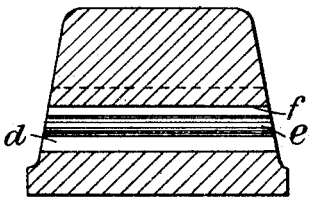
Fig. 3 is a section on the line 3ᵃ—3ᵃ of Fig. 1.
Figure 4:
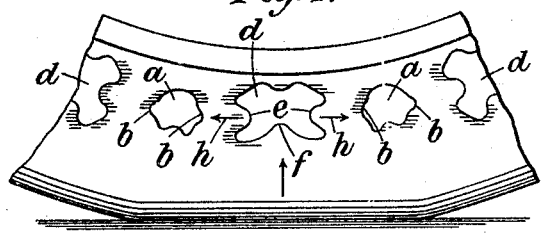
Fig. 4 is a side elevation of the tire showing in an exaggerated manner the compression of the tire when a large aperture is on the line of compression.

Referring to the drawings, the small holes are indicated by the reference letter $a$ and it is preferred to provide each hole $a$ with a pair of diametrically opposite bays $b$ arranged on a line concentric with the axis of the wheel and passing through the centre of the hole $a$. In addition to the bays $b$ it is preferred to employ an inwardly directed projection $c$ arranged on the outer part of each hole $a$. Interposed between each pair of holes $a$ is a large hole $d$ which (in Figs. 1–4) is preferably of the configuration shown in Fig. 1, in which the hole is of polygonal form and is provided with a pair of diametrically opposite inwardly directed projections $e$ of substantially semi-circular cross section. Arranged on a radial line between these projections $e$ is an inwardly directed projection $f$ on the outer part of the hole $d$. The proportions and arrangement of the hole $d$ and the projections $e$ and $f$ are preferably substantially as shown in Fig. 1, and with such arrangement, when radial pressure, as shown in Fig. 4 passes through a large hole $d$, it has the result of separating the projections $e$ and moving the projection $f$ inwards, so that the radial width of the hole in question is reduced and its circumferential width is increased. The direction in which the walls of the selected hole $d$ flex is indicated by the arrows in Fig. 4, the vertical arrow indicating the radial direction, and the horizontal arrows $h$ indicating the diametrically opposite circumferential direction. The result of forces acting in the direction of the arrow $h$ upon the small holes $a$ is shown in Fig. 4, in which it will be seen that the small holes absorb by the flexing of their walls, the pressure acting in directions of the arrows $h$.

When radial pressure instead of passing through a large hole $d$ passes through a small hole $a$, the large holes each side of the selected small hole prevent the major portion of internal stresses of the tire by flexing.

Figure 5:
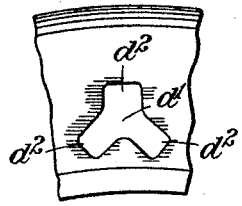
Fig. 5 shows a modified form of large hole.
Figure 6:
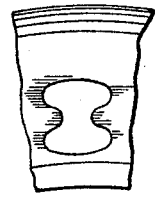
Fig. 6 shows a still further modified form of large hole.

In Fig. 5 is shown a modified form of large hole $d'$ which is in the form of three symmetrically arranged openings $d^2$ radiating from a common point. This configuration of hole has practically the same result as the holes $d$ hereinbefore referred to, inasmuch as the walls of each opening $d^2$ readily flex when radial pressure is applied and also readily conform to any forces acting in the direction of the arrows $h$.

Having now described my invention what I claim as new and desire to secure by Letters Patent is:—

A solid tire for vehicles, provided with two series of transversely extending openings, the openings of one series being disposed alternately with those of the other series in a line passing through the tire concentrically with its axis of rotation, each opening of one series being of polygonal configuration and having oppositely disposed inwardly extending ribs and each opening of the other series having bays in opposite side walls thereof extending toward the ribs of the other series.

In testimony whereof I have signed my name to this specification.

JOHN BARKER.